US012669615B2

(12) United States Patent
Park et al.

(10) Patent No.: US 12,669,615 B2
(45) Date of Patent: Jun. 30, 2026

(54) APPARATUS AND METHOD FOR DUPLEXING SENSOR OF MOBILE ROBOT

(71) Applicants: Yujin Robot Co., Ltd., Incheon (KR); Miele & Cie. KG, Gütersloh (DE)

(72) Inventors: Seong Ju Park, Incheon (KR); Dong Hyeon Seo, Incheon (KR); Seung Ho Jang, Incheon (KR); Min Chang, Incheon (KR); Yun Jib Kim, Incheon (KR); Chang Woo Kim, Incheon (KR)

(73) Assignees: Yujin Robot Co., Ltd., Incheon (KR); Miele & Cie. KG, Gütersloh (DE)

( * ) Notice: Subject to any disclaimer, the term of this patent is extended or adjusted under 35 U.S.C. 154(b) by 271 days.

(21) Appl. No.: 18/316,927

(22) Filed: May 12, 2023

(65) Prior Publication Data

US 2024/0077618 A1 Mar. 7, 2024

Related U.S. Application Data

(63) Continuation-in-part of application No. PCT/KR2021/016526, filed on Nov. 12, 2021.

(30) Foreign Application Priority Data

Nov. 12, 2020 (KR) ........................ 10-2020-0151001
Nov. 10, 2021 (KR) ........................ 10-2021-0153766
(Continued)

(51) Int. Cl.
*G01S 17/931* (2020.01)
*B25J 9/16* (2006.01)
(Continued)

(52) U.S. Cl.
CPC ........... *G01S 17/931* (2020.01); *B25J 9/1653* (2013.01); *B25J 9/1666* (2013.01); *B25J 9/1676* (2013.01);
(Continued)

(58) Field of Classification Search
CPC ..... G01S 17/931; B25J 9/1653; B25J 9/1666; B25J 9/1676; B25J 9/022; B25J 13/089;
(Continued)

(56) References Cited

U.S. PATENT DOCUMENTS 6,771,208 B2 * 8/2004 Lutter ..................... G01S 11/12
342/52
2005/0154503 A1 * 7/2005 Jacobs ................... G05D 1/024
701/1
(Continued)

FOREIGN PATENT DOCUMENTS

KR 10-2008-0027675 A 3/2008
KR 10-2018-0061929 A 6/2018
(Continued)

OTHER PUBLICATIONS

International Search Report for PCT/KR2021/016526 by Korean Intellectual Property Office dated Feb. 18, 2022.

*Primary Examiner* — Aaron L Troost
(74) *Attorney, Agent, or Firm* — BROADVIEW IP LAW, PC

(57) ABSTRACT

A sensor duplexing apparatus and method are provided for a mobile robot to enhance obstacle detection reliability and ensure functional safety. The apparatus includes multiple sensors, logic boards, and a control unit that dynamically selects and compares sensor outputs within predefined duplexing areas. If inconsistencies are detected, the system identifies faulty sensors and applies fault recovery or correction procedures. By duplicating critical sensing functions and enabling real-time error handling, the system satisfies safety performance requirements such as performance level d (PL-d), allowing stable and reliable robot operation even under sensor failure conditions.

16 Claims, 16 Drawing Sheets

(30)     Foreign Application Priority Data

Nov. 10, 2021    (KR) ........................ 10-2021-0153767
Nov. 10, 2021    (KR) ........................ 10-2021-0153768

(51)   Int. Cl.
       *B25J 13/08*          (2006.01)
       *B25J 19/02*          (2006.01)
       *G05D 1/00*           (2024.01)
       *G05D 1/617*          (2024.01)

(52)   U.S. Cl.
       CPC ........... *B25J 13/089* (2013.01); *B25J 19/022*
                 (2013.01); *G05D 1/0214* (2013.01); *G05D*
                                               *1/617* (2024.01)

(58)   Field of Classification Search
       CPC ... B25J 11/008; G05D 1/0214; G05D 1/2424;
                   G05D 1/637; G05D 2109/10; G05D
                   2111/17; G05B 2219/39091; G05B
                                               2219/40476
       See application file for complete search history.

(56)              References Cited

U.S. PATENT DOCUMENTS

| 2016/0313364 | A1  |         | 10/2016 | Kawai et al.            |
| 2017/0025019 | A1  |         | 1/2017  | Pink et al.             |
| 2017/0144307 | A1  |         | 5/2017  | Rublee et al.           |
| 2018/0173223 | A1  |         | 6/2018  | Doane et al.            |
| 2018/0372875 | A1* |         | 12/2018 | Juelsgaard ............ G01S 17/931 |
| 2019/0161274 | A1  |         | 5/2019  | Paschall, II et al.     |
| 2019/0262993 | A1  |         | 8/2019  | Cole et al.             |
| 2019/0272671 | A1* |         | 9/2019  | Zhang ..................... G06T 17/20 |
| 2020/0192341 | A1  |         | 6/2020  | Weaver                  |
| 2021/0018927 | A1  |         | 1/2021  | Ackerman et al.         |
| 2021/0213619 | A1  |         | 7/2021  | Hong                    |

FOREIGN PATENT DOCUMENTS

| KR  | 10-2018-0099090 A | 9/2018  |
| KR  | 10-1986919 B1     | 6/2019  |
| WO  | 2021/208225 A1    | 10/2021 |

* cited by examiner

APPARATUS AND METHOD FOR DUPLEXING SENSOR OF MOBILE ROBOT

CROSS-REFERENCE TO RELATED APPLICATIONS

This application is a Continuation-in-part of pending PCT International Application No. PCT/KR2021/016526 filed on Nov. 12, 2021, which claims priority to Korean Patent Application No. 10-2020-0151001 filed on Nov. 12, 2020, Korean Patent Application No. 10-2021-0153766 filed on Nov. 10, 2021, Korean Patent Application No. 10-2021-0153767 filed on Nov. 10, 2021, and Korean Patent Application No. 10-2021-0153768 filed on Nov. 10, 2021, in the Korean Intellectual Property Office, the entire contents of which are hereby incorporated by references in its entirety.

BACKGROUND

Field

The present disclosure relates to a functional safety system of a robot, and more particularly, to a sensor duplexing apparatus and method of a mobile robot which duplex a module to satisfy a performance level d (pl-d) required by robot functional safety.

Description of the Related Art

In order to ensure a safety of the robot, the duplexing of the module at a performance level (pl) related to the functional safety is being demanded. The duplex system can be simply implemented using a LiDAR sensor certified for the performance level d (pl-d). However, the LiDAR sensor certified for the performance level d (pl-d) is expensive so that there is a problem in that it takes a lot of money to implement the duplex system. Further, only a function provided by a manufacturer that manufactures the corresponding LiDAR sensor can be used so that it is difficult to flexibly implement a function.

SUMMARY

An object to be achieved by the present disclosure is to provide an apparatus and a method for modularizing a duplex system architecture of a mobile robot which duplex a sensor using obstacle information detected by a sensor to satisfy a performance level d (pl-d) demanded by the functional system of a robot.

Other and further objects of the present disclosure which are not specifically described can be further considered within the scope easily deduced from the following detailed description and the effect.

In order to achieve the above-described objects, according to an aspect of the present disclosure, a sensor duplexing apparatus of a mobile robot includes an input unit which includes a plurality sensors mounted to sense obstacles located in the vicinity of a mobile robot; a logic unit which includes a plurality of logic boards corresponding to the sensors; an output unit which outputs a result according to a logical operation of the logic unit; and a controller which duplexes the sensor in the unit of predetermined duplexing areas based on obstacle information detected by each of the plurality of sensors.

Here, the controller duplexes two sensors based on obstacle information detected by two sensors corresponding to the duplexing area.

Here, when obstacle information detected by two sensors corresponding to the duplexing area match, the controller determines that duplexing of two sensors is successful and when obstacle information detected by two sensors corresponding to the duplexing area do not match, the controller determines that duplexing of two sensors has failed.

Here, the controller identifies whether the obstacle information detected by two sensors corresponding to the duplexing area match using predetermined sensor error information.

Here, the controller duplexes two sensors using obstacle information detected by two sensors based on the dynamic safety zone generated by two sensors corresponding to the duplexing area.

Here, in the input unit, a first sensor is mounted at a front left side of the robot, a second sensor mounted at a front right side of the robot, a third sensor mounted at a rear left side of the robot, and a fourth sensor mounted at a rear right side of the robot, the logic unit includes a first logic unit corresponding to the first sensor, a second logic unit corresponding to the second sensor, a third logic board corresponding to the third sensor, and a fourth logic board corresponding to the fourth sensor, and the duplexing area includes a first duplexing area corresponding to the first sensor and the second sensor, a second duplexing area corresponding to the first sensor and the third sensor, a third duplexing area corresponding to the second sensor and the fourth sensor, and a fourth duplexing area corresponding to the third sensor and the fourth sensor.

Here, in the input unit, a first sensor is mounted at one left side of the robot and a second sensor is mounted at one right side of the robot, in the logic unit, a first logic board corresponding to the first sensor and a second logic board corresponding to the second sensor are mounted, and the first sensor and the second sensor correspond to the duplexing area.

Here, the logic board and the controller are integrally implemented and the logic board duplexes two sensors based on obstacle information detected by two sensors corresponding to the duplexing area.

Here, the sensor mounted in the input unit is a LiDAR sensor.

Here, a sensor duplexing apparatus of a mobile robot includes a duplex sensor operation determining unit which acquires sensor data for every duplexing target from the logic unit to determine a normal operation or an abnormal operation of the duplex sensor.

Here, the duplex sensor operation determining unit reviews the reliability by comparing two sensor data acquired for every duplexing target and determines that the reliability review has been passed when two sensor data is the same, and determines that the reliability review has not been passed when two sensor data is different.

Here, the duplex sensor operation determining unit generates a defect diagnosis signal of an abnormal sensor which has not passed the reliability review by considering at least one of whether to collect data, whether a power is normally supplied, and whether a sensor transmitter/receiver normally operates.

Here, the mobile robot compares a coordinate of the sensor data for two sensor included in a predetermined duplexing area and the target detection coordinate and when the target detection coordinates of two sensors are not the same, determines that there is an abnormal sensor and transmits a correction coordinate signal to the abnormal sensor or corrects the abnormal sensor by synchronization with the normal sensor.

In order to achieve the above-described objects, according to an aspect of the present disclosure, a sensor duplexing method configured by a sensor duplexing apparatus of a mobile robot including: an input unit which includes a plurality sensors mounted to sense obstacles located in the vicinity of a mobile robot; a logic unit which includes a plurality of logic boards corresponding to the sensors; an output unit which outputs a result according to a logical operation of the logic unit; and a control unit, the method comprising: detecting obstacle information by means of each of the plurality of sensors; and duplexing the sensor in the unit of predetermined duplexing areas based on the obstacle information detected by each of the plurality of sensors.

Here, the duplexing is configured by: duplexing two sensors based on obstacle information detected by two sensors corresponding to the duplexing area.

Here, the duplexing is configured by determining that duplexing of two sensors is successful when obstacle information detected by two sensors corresponding to the duplexing area match, and determining that duplexing of two sensors has failed when obstacle information detected by two sensors corresponding to the duplexing area do not match.

Further, according to the apparatus and the method for duplexing a sensor of a mobile robot according to the exemplary embodiment of the present disclosure, in order to satisfy the performance level d (pl-d) demanded by the functional safety of the robot, the sensor is duplexed using obstacle information detected by the sensor so that a duplex system may be implemented using a cheap general LiDAR sensor which is not certified for pl-d.

The effects of the present invention are not limited to the technical effects mentioned above, and other effects which are not mentioned can be clearly understood by those skilled in the art from the following description.

BRIEF DESCRIPTION OF DRAWINGS

FIG. 6 is a view for explaining a duplexing area according to an obstacle a sensor duplexing apparatus illustrated in FIG. 4;

Figure 10:
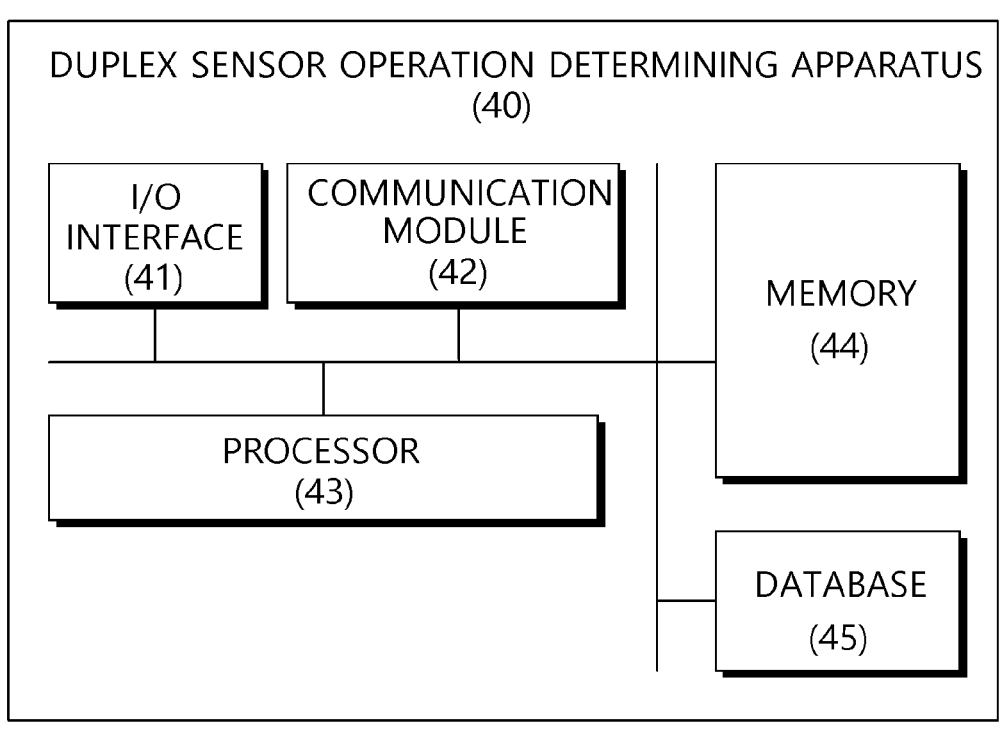
Figure 11:
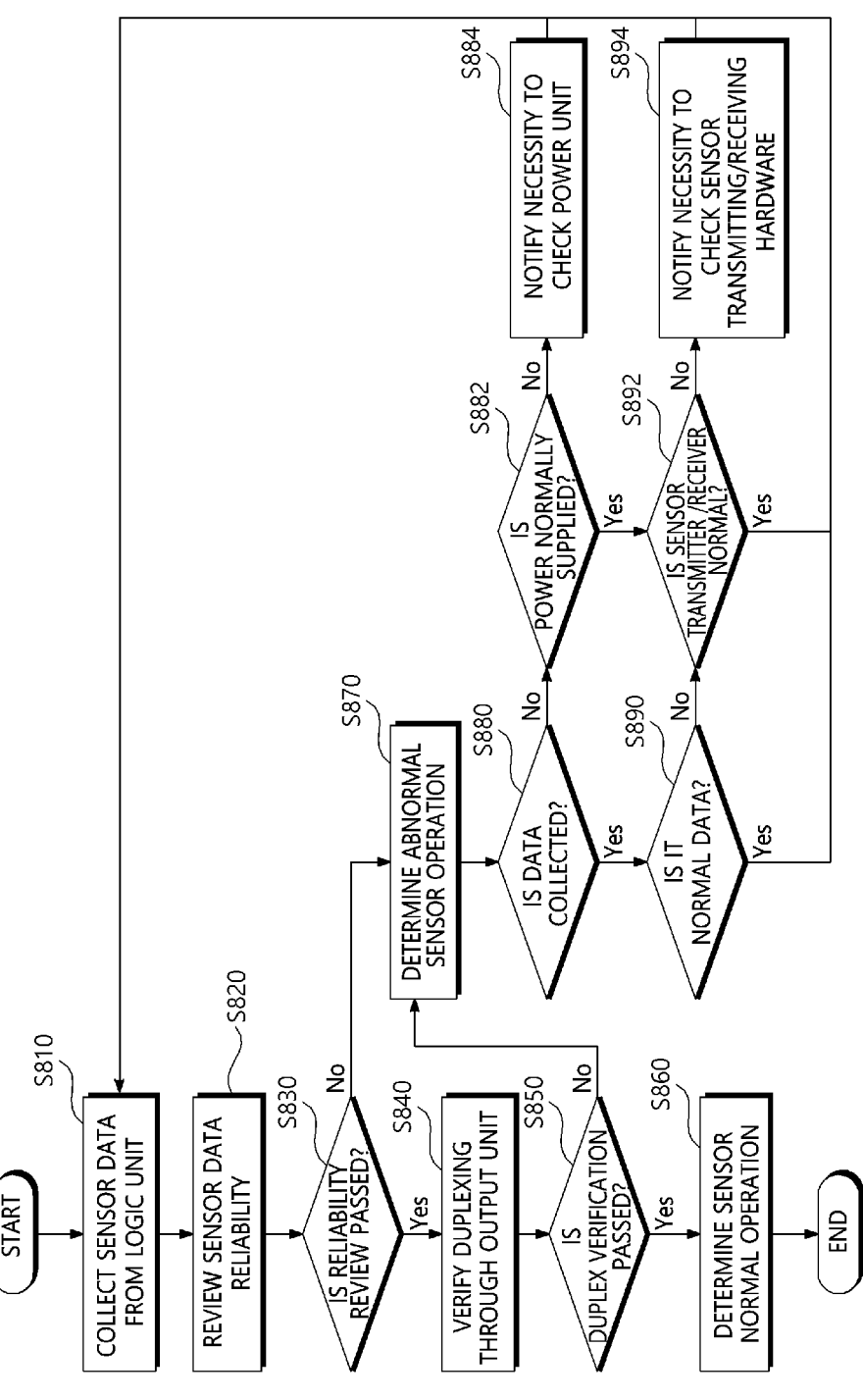
Figure 12:
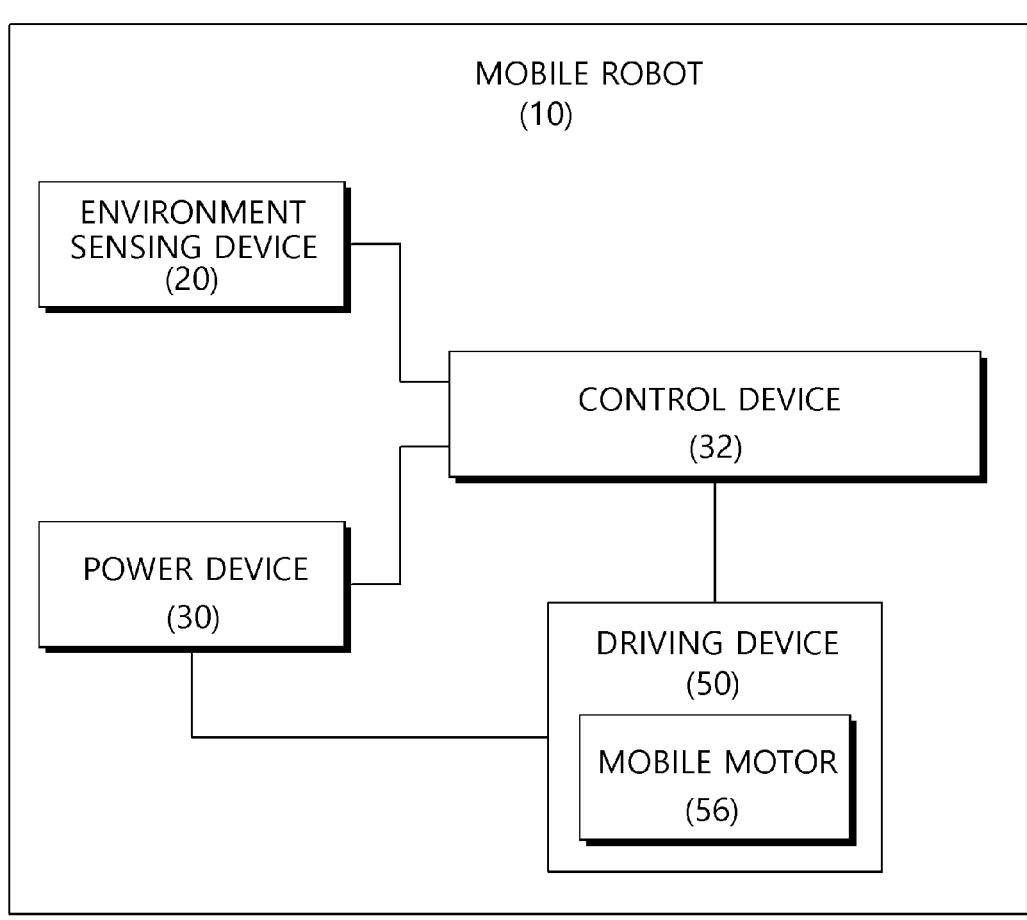
Figure 13:
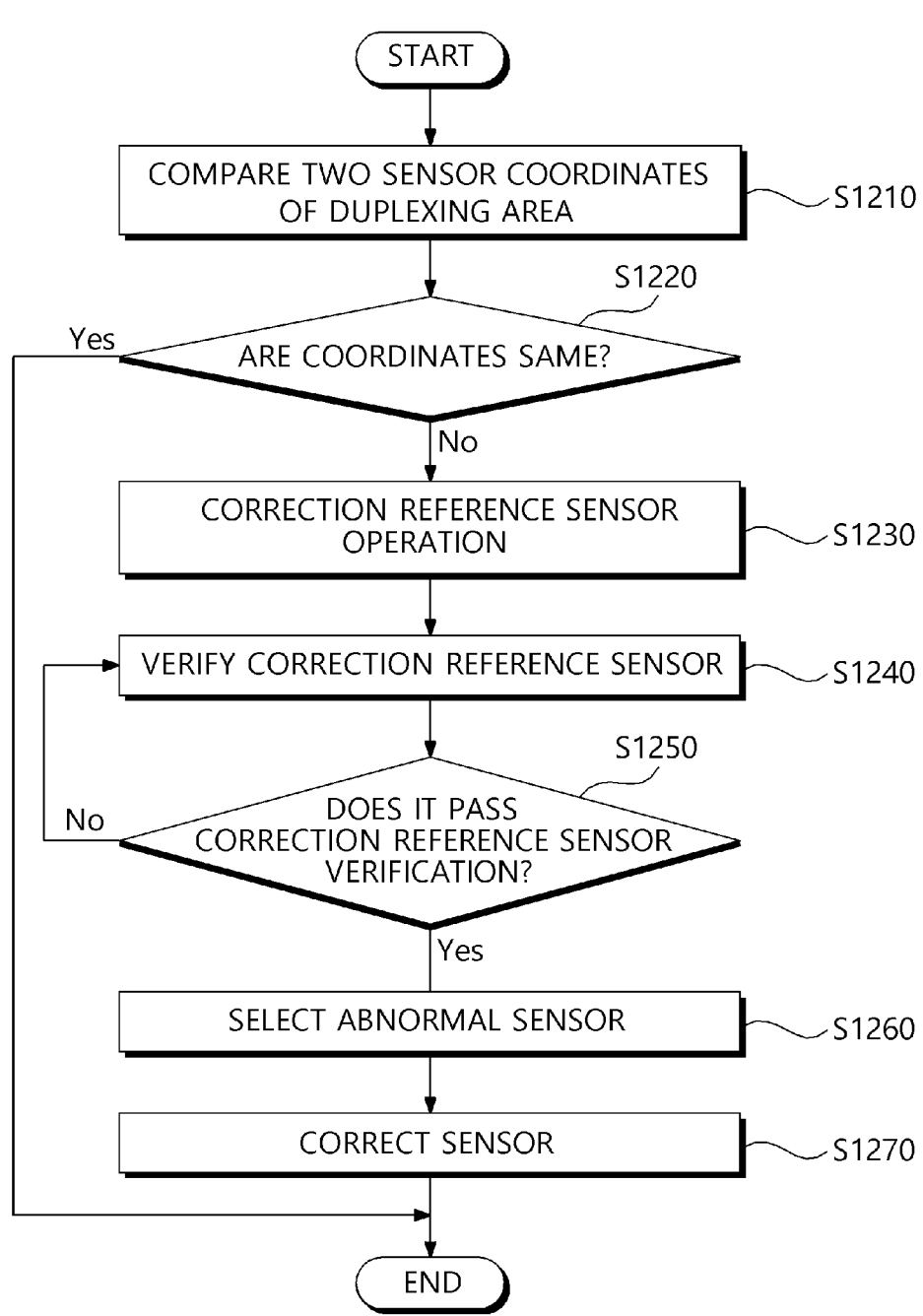
Figure 14:
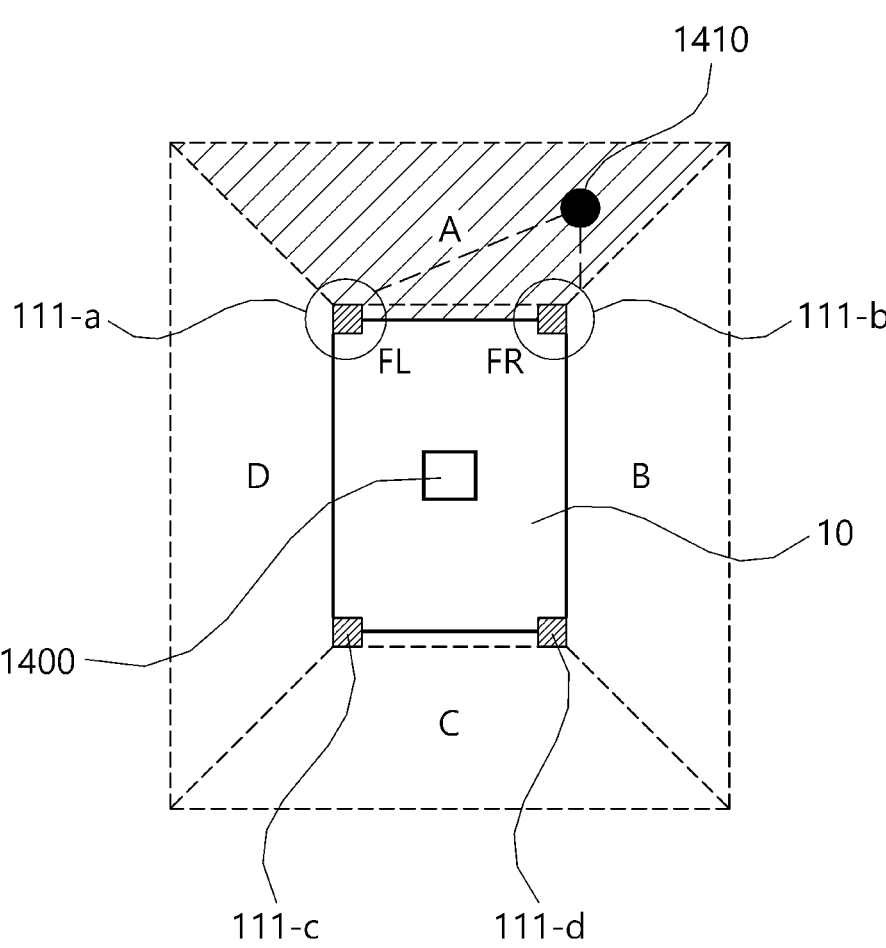

4 including a duplex sensor operation determining unit according to an exemplary embodiment of the present disclosure;

FIG. 10 is a block diagram schematically illustrating a duplex sensor operation determining device according to an exemplary embodiment of the present disclosure;

FIG. 11 is a flowchart for explaining a duplex sensor operation determining method according to an exemplary embodiment of the present disclosure;

FIG. 12 is a block diagram schematically illustrating a mobile robot according to an exemplary embodiment of the present disclosure;

FIG. 13 is a flowchart for explaining a sensor correcting method according to an exemplary embodiment of the present disclosure; and FIGS. 14 to 16 are exemplary views for explaining a sensor correcting operation according to an exemplary embodiment of the present disclosure.

DETAILED DESCRIPTION OF THE EMBODIMENT

Hereinafter, embodiments of the present invention will be described in detail with reference to the accompanying drawings. Advantages and features of the present disclosure, and methods for accomplishing the same will be more clearly understood from exemplary embodiments described below with reference to the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may be referred to as a second component, and similarly, a second component may be referred to as a first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

The term "~unit" used in the specification refers to a software or hardware component such as a field programmable gate array (FPGA) or an ASIC and "~unit" performs some functions. However, "~unit" is not limited to the software or the hardware. "~unit" may be configured to be in an addressable storage medium or may be configured to reproduce one or more processors. Accordingly, as an example, "~unit" includes components such as software components, object oriented software components, class components, and task components, processes, functions, attributes, procedures, subroutines, segments of a program code, drivers, a firmware, a microcode, a circuit, data, database, and data structures. A function which is provided in the components and "~units" may be combined with a smaller number of components and "~units" or divided into additional components and "~units".

Hereinafter, a functional safety system of a robot according to the present disclosure will be described in detail with reference to the accompanying drawing.

The functional safety system of a robot according to the present disclosure duplexes a system module and a LiDAR sensor for a performance level d (pl-d).

Figure 1:
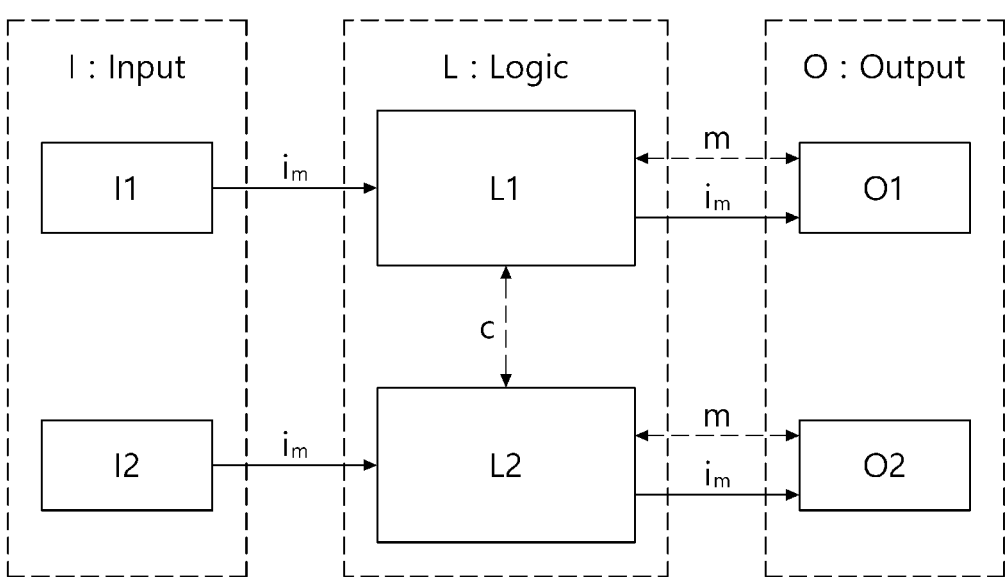
FIG. 1 is a view for explaining a duplexing concept for a performance level d with category 3 required by a robot functional safety.

FIG. 1 is a view for explaining a duplexing concept for a performance level d with category 3 required by a robot functional safety.

An apparatus and a method for duplexing a sensor of a mobile robot which is an exemplary embodiment of a functional safety system of a robot according to the present disclosure will be described in detail with reference to FIGS. 2 to 8.

First, an apparatus for duplexing a sensor of a mobile robot according to an exemplary embodiment of the present disclosure will be described with reference to FIGS. 2 and 3.

Figure 2:
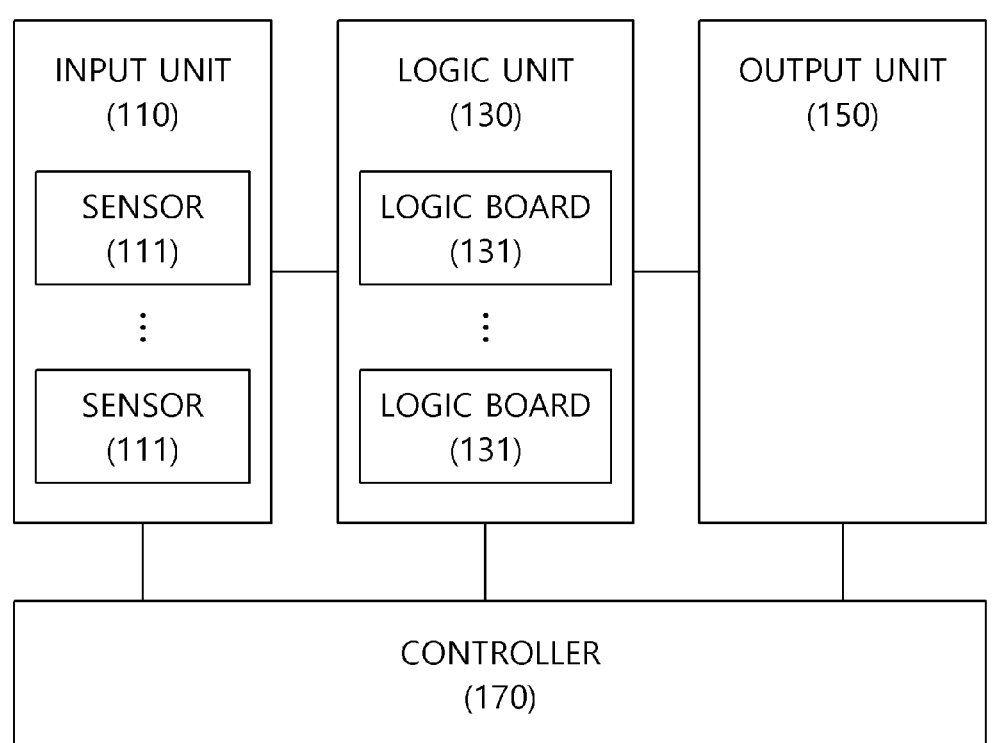
FIG. 2 is a block diagram for explaining a sensor duplexing apparatus of a mobile robot according to an exemplary embodiment of the present disclosure.
Figure 3:
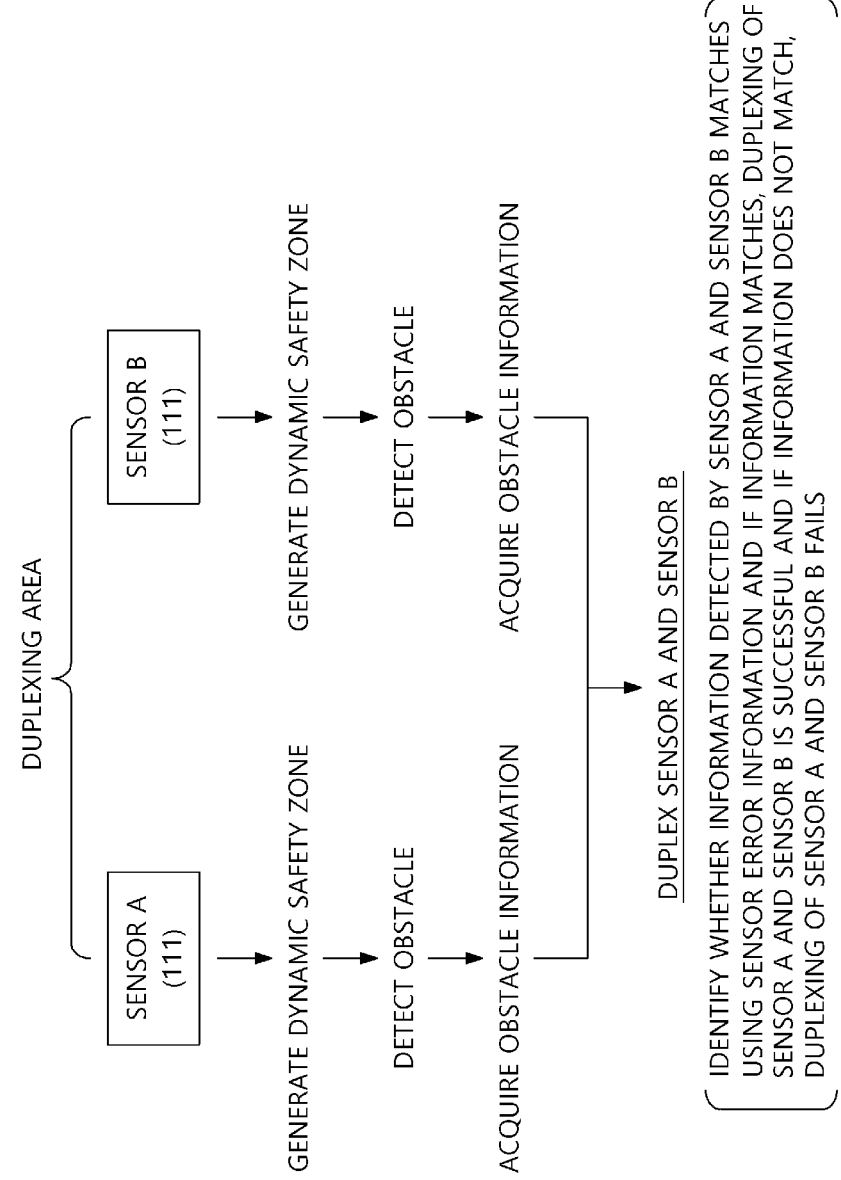
FIG. 3 is a diagram illustrating a process of duplexing a sensor according to a third embodiment of the present disclosure.

FIG. 2 is a block diagram for explaining a sensor duplexing apparatus of a mobile robot according to an exemplary embodiment of the present disclosure and FIG. 3 is a diagram illustrating a process of duplexing a sensor according to a third embodiment of the present disclosure.

Referring to FIG. 2, the apparatus 100 for duplexing a sensor of a mobile robot according to a second exemplary embodiment of the present disclosure (hereinafter, referred to as a "sensor duplexing apparatus") may duplex a sensor using obstacle information detected by the sensor to satisfy the pl-d (performance level d) requested by the robot functional safety.

Here, the present disclosure is applicable to household cleaning robots, public building cleaning robots, logistics robots, service robots, as well as industrial robots.

In order to satisfy pl-d requested by the functional safety of the robot, as illustrated in FIG. 1, three module terminals including a input terminal I, a logic terminal L, and an output terminal O need to be duplexed. The input terminal is duplexed to a "LiDAR sensor A (I1)" and a LiDAR sensor B(I2)", the logic terminal is duplexed to a "LiDAR logic board A (L1)" and a "LiDAR logic board B(L2)", and the output terminal is duplexed to "01" and "02" and stops when the result is "0" or "2". The present disclosure relates to a method for duplexing two LiDAR sensors using an obstacle present in a safety zone, by two LiDAR sensors which configures the logic terminal, rather than the view point of the system architecture.

To this end, the sensor duplexing apparatus 100 includes an input unit 110, a logic unit 130, an output unit 150, and a controller 170.

A plurality of sensors 111 may be mounted in the input unit 110.

Here, the sensor may be a LiDAR sensor.

In the logic unit 130, a plurality of logic boards corresponding to the plurality of sensors 111 mounted in the input unit 110 may be mounted.

Here, the logic board may be a LiDAR board.

The output unit 150 transmits an output value to the outside based on outputs of the plurality of logic boards 131 mounted in the logic unit 130.

The controller 170 may duplex a sensor in the unit of predetermined duplexing areas, based on the obstacle information detected by the plurality of sensors 111.

Here, the duplexing area refers to a spatial area which is duplexed using obstacle information detected by two sensors 111 to satisfy pl-d (performance level d) requested by the functional safety.

That is, the controller 170 may duplex two sensors 111 based on obstacle information detected by two sensors 111 corresponding to the duplexing area.

To be more specific, the controller 170 may duplex two sensors 111 using obstacle information detected by two sensors 111 based on a dynamic safety zone generated by two sensors 111 corresponding to the duplexing area. At this time, the dynamic safety zone may be dynamically generated based on the movement direction and the movement speed of the robot in which the sensor duplexing apparatus 100 is mounted and the detailed description thereof is the same as the above-described first exemplary embodiment according to the present disclosure.

Here, when the obstacle information detected by two sensors 111 corresponding to the duplexing area match, the controller 170 may determine that two sensors 111 are successfully duplexed. Here, when the obstacle information detected by two sensors 111 corresponding to the duplexing area match, the controller 170 may determine that the duplexing of two sensors 111 has failed.

At this time, the controller 170 may identify whether the obstacle information detected by two sensors 111 corresponding to the duplexing area match using predetermined sensor error information.

For example, as illustrated in FIG. 3, when "sensor A" and "sensor B" correspond to the duplexing area, an obstacle is detected from a dynamic safety zone generated by the "sensor A" to obtain obstacle information and an obstacle is detected from a dynamic safety zone generated by the "sensor B" to obtain obstacle information. Next, the "sensor A" and the "sensor B" are duplexed using the obstacle information detected by the "sensor A" and the obstacle information detected by the "sensor B". That is, it is identified whether the obstacle information detected by the "sensor A" and the obstacle information detected by the "sensor B" match. At this time, when the obstacle according to the obstacle information is located in a boundary of adjacent duplexing areas, it is identified whether the obstacle information detected by the "sensor A" and the obstacle information detected by the "sensor B" match using sensor error information. As a result of identification, if the information match, it is determined that the "sensor A" and the "sensor B" are successfully duplexed and if not, it is determined that the duplexing of the "sensor A" and the "sensor B" has failed.

In the meantime, the logic board 131 and the controller 170 are integrally implemented so that the logic board 131 performs an operation of the controller 170.

That is, the logic board 131 may duplex two sensors 111 based on obstacle information detected by two sensors 111 corresponding to the duplexing area.

For example, when the "sensor A" and the "sensor B" correspond to the duplexing area, the "logic board A"

corresponds to the "sensor A", and the "logic board B" corresponds to the "sensor B", if the "logic board A" acquires obstacle information detected by the "sensor A", the "logic board A" identifies the duplexing area from which the obstacle is detected based on the obstacle information detected by the "sensor A". When the identified duplexing area is a duplexing area which corresponds to the "sensor A" and the "sensor B", the "logic board A" is supplied with the obstacle information detected by the "sensor B" from the "logic board B". By doing this, the "logic board A" identifies whether the obstacle information detected by the "sensor A" and the obstacle information detected by the "sensor B" match.

Now, an example of an apparatus for duplexing a sensor of a mobile robot according to an exemplary embodiment of the present disclosure will be described with reference to FIGS. 4 to 6.

Figure 4:
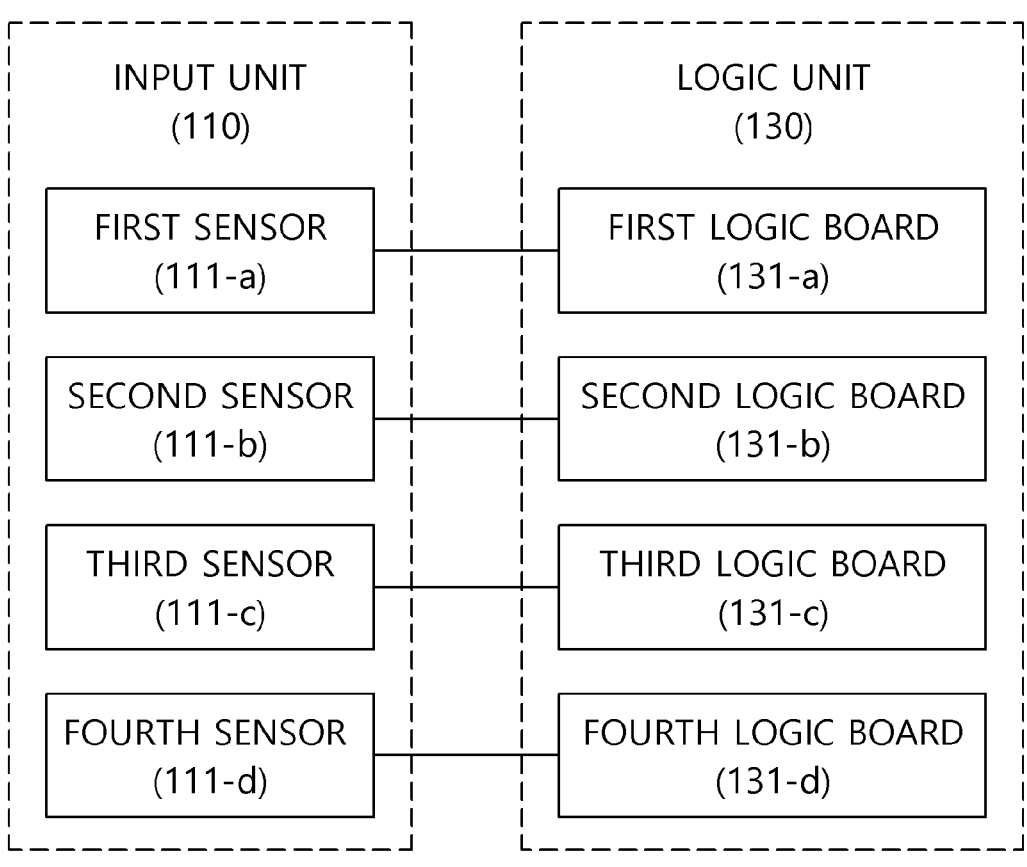
FIG. 4 is a block diagram for explaining an input unit and a logic unit of an example of a sensor duplexing apparatus of a mobile robot according to an exemplary embodiment of the present disclosure.
Figure 5:
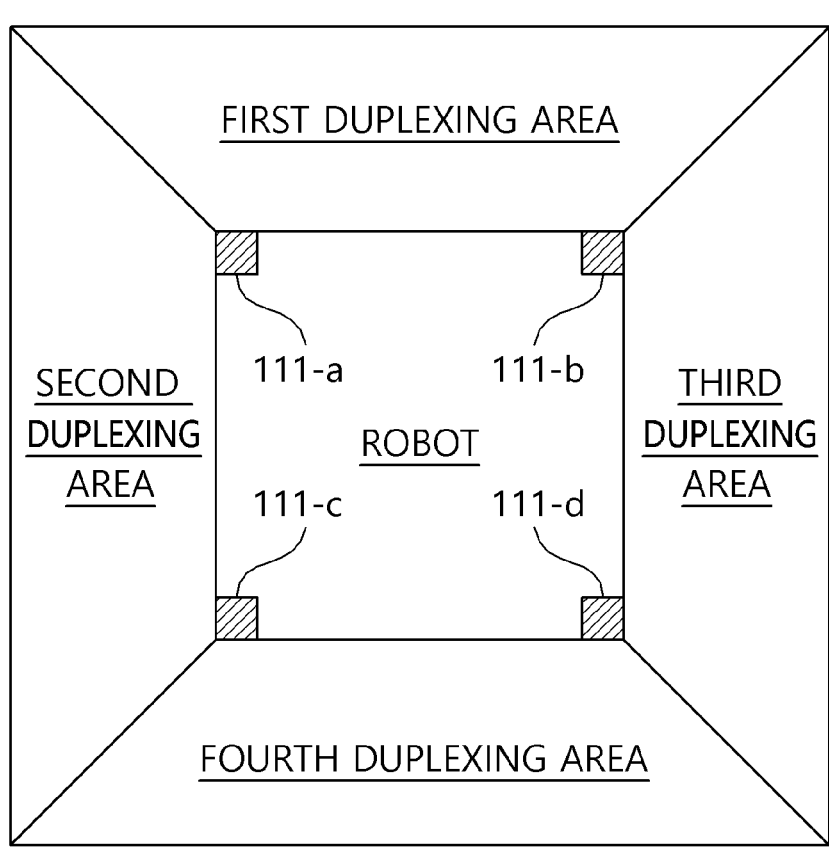
FIG. 5 is a view for explaining a duplexing area of a sensor duplexing apparatus illustrated in FIG. 4.
Figure 6:
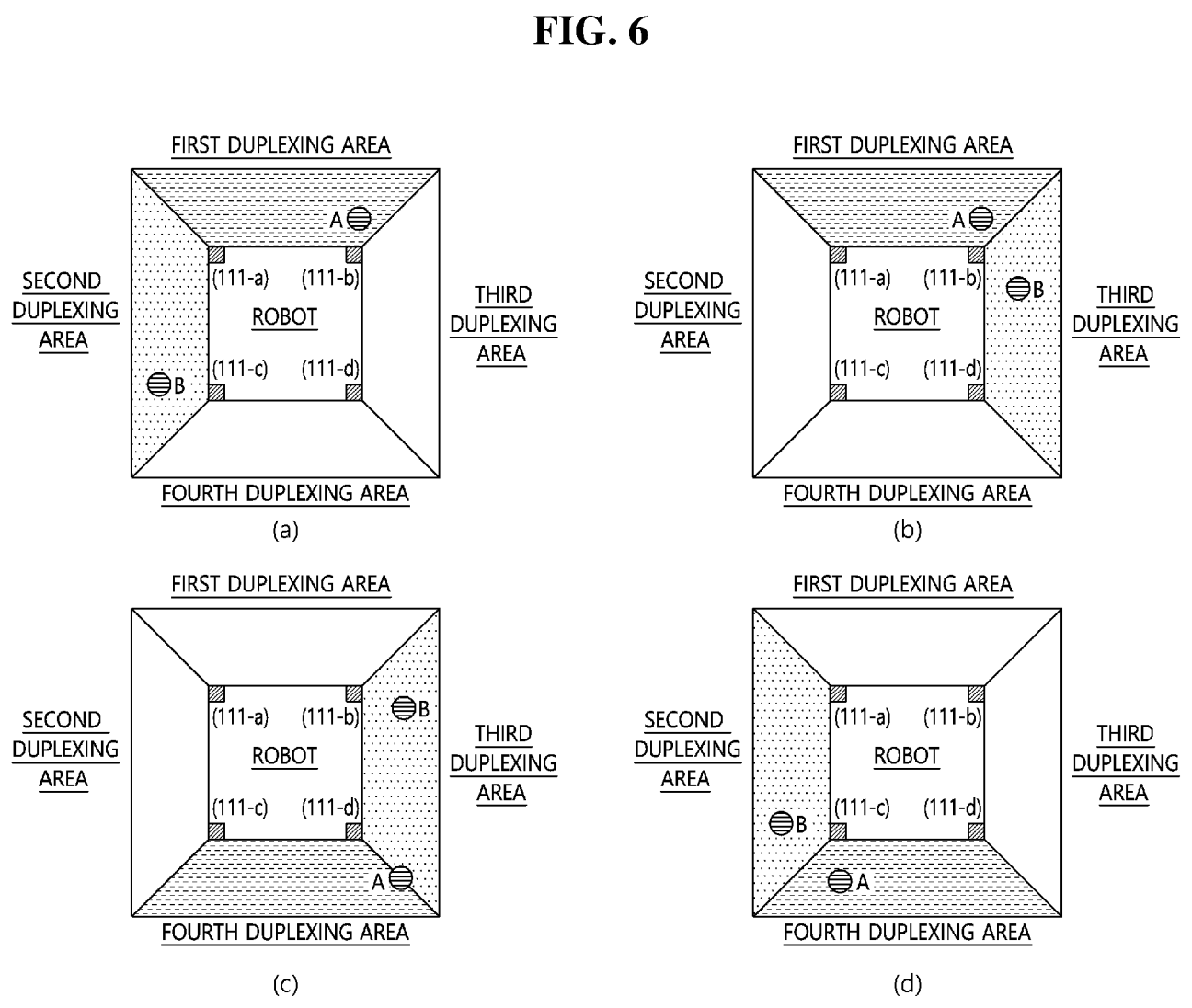

FIG. 4 is a block diagram for explaining an input unit and a logic unit of an example of a sensor duplexing apparatus of a mobile robot according to an exemplary embodiment of the present disclosure, FIG. 5 is a view for explaining a duplexing area of a sensor duplexing apparatus illustrated in FIG. 4, and FIG. 6 is a view for explaining a duplexing area according to an obstacle a sensor duplexing apparatus illustrated in FIG. 4.

Referring to FIGS. 4 and 5, an input unit 110 according to an example of the sensor duplexing apparatus 100 includes a first sensor 111-a mounted at a front left side of the robot, a second sensor 111-b mounted at a front right side of the robot, a third sensor 111-c mounted at a rear left side of the robot, and a fourth sensor 111-d mounted at a rear left side of the robot.

The logic unit 130 according to an example of the sensor duplexing apparatus 100 includes a first logic board 131-a corresponding to the first sensor 111-a, a second logic board 131-b corresponding to the second sensor 111-b, a third logic board 131-c corresponding to the third sensor 111-c, and a fourth logic board 131-d corresponding to the fourth sensor 111-d. The duplexing area includes a first duplexing area which corresponds to the first sensor 111-a and the second sensor 111-b, a second duplexing area which corresponds to the first sensor 111-a and the third sensor 111-c, a third duplexing area which corresponds to the second sensor 111-b and the fourth sensor 111-d, and a fourth duplexing area which corresponds to the third sensor 111-c and the fourth sensor 111-d.

That is, the duplexing of the sensor 111 may be implemented in the omni-directional area of the robot (the first duplexing area which is the front area of the robot, the second duplexing area which is the left area of the robot, the third duplexing area which is the right area of the robot, and the fourth duplexing area which is the rear area of the robot.

For example, as illustrated in FIG. 6(a), when "obstacle A" is detected, the "first duplexing area" which corresponds to the "obstacle A" is identified and the sensor duplexing is performed in the "first duplexing area" using obstacle information detected by two sensors corresponding to the "first duplexing area": "first sensor 111-a" and "second sensor 111-b". When "obstacle B" is detected, the "second duplexing area" which corresponds to the "obstacle B" is identified and the sensor duplexing is performed in the "second duplexing area" using obstacle information detected by two sensors corresponding to the "second duplexing area": "first sensor 111-a" and "third sensor 111-c".

Further, as illustrated in FIG. 6(b), when "obstacle A" is detected, the "first duplexing area" which corresponds to the "obstacle A" is identified and the sensor duplexing is performed in the "first duplexing area" using obstacle information detected by two sensors corresponding to the "first duplexing area": "first sensor 111-a" and "second sensor 111-b". When "obstacle B" is detected, the "third duplexing area" which corresponds to the "obstacle B" is identified and the sensor duplexing is performed in the "third duplexing area" using obstacle information detected by two sensors corresponding to the "third duplexing area": "second sensor 111-b" and "fourth sensor 111-d".

Further, as illustrated in FIG. 6(c), when "obstacle A" is detected, the "fourth duplexing area" which corresponds to the "obstacle A" is identified and the sensor duplexing is performed in the "fourth duplexing area" using obstacle information detected by two sensors corresponding to the "fourth duplexing area": "third sensor 111-c" and "fourth sensor 111-d". At this time, when the "obstacle A" is located in the boundary of adjacent duplexing areas (the third duplexing area and the fourth duplexing area), it is identified whether the obstacle information detected by the "third sensor 111-c" and the obstacle information detected by the "fourth sensor 111-d" match using the sensor error information. When "obstacle B" is detected, the "third duplexing area" which corresponds to the "obstacle B" is identified and the sensor duplexing is performed in the "third duplexing area" using obstacle information detected by two sensors corresponding to the "third duplexing area": "second sensor 111-b" and "fourth sensor 111-d".

Further, as illustrated in FIG. 6(d), when "obstacle A" is detected, the "fourth duplexing area" which corresponds to the "obstacle A" is identified and the sensor duplexing is performed in the "fourth duplexing area" using obstacle information detected by two sensors corresponding to the "fourth duplexing area": "third sensor 111-c" and "fourth sensor 111-d". When "obstacle B" is detected, the "second duplexing area" which corresponds to the "obstacle B" is identified and the sensor duplexing is performed in the "second duplexing area" using obstacle information detected by two sensors corresponding to the "second duplexing area": "first sensor 111-a" and "third sensor 111-c".

Now, another example of a sensor duplexing apparatus of a mobile robot according to an exemplary embodiment of the present disclosure will be described with reference to FIG. 7.

Figure 7:
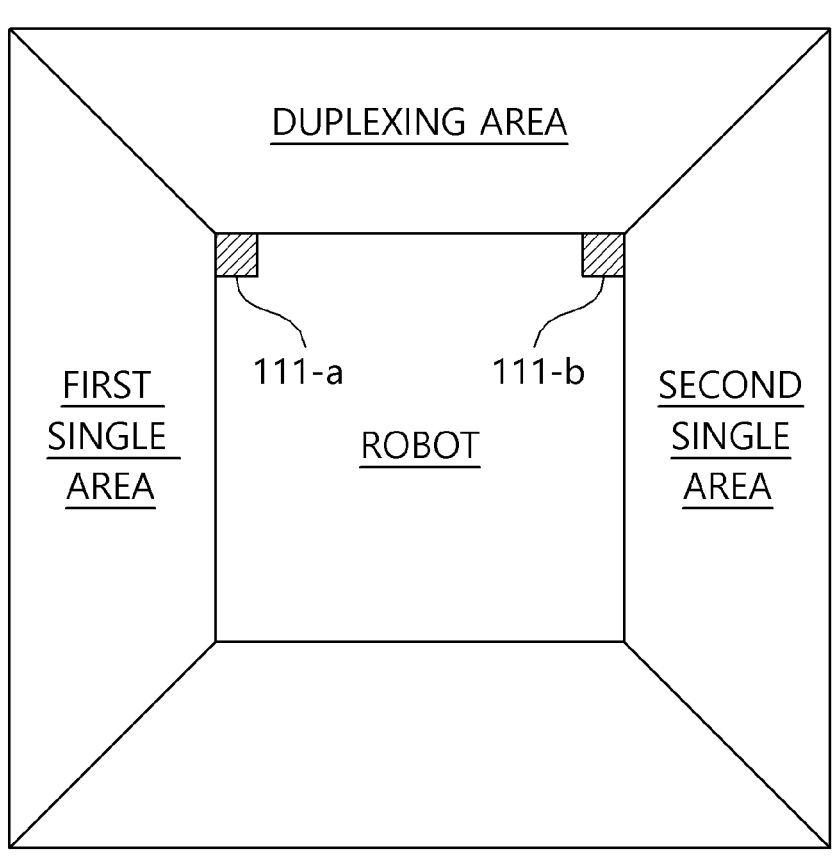
FIG. 7 is a view for explaining an duplexing area of a sensor duplexing apparatus of a mobile robot according to an exemplary embodiment of the present disclosure.

FIG. 7 is a view for explaining a duplexing area of a sensor duplexing apparatus of a mobile robot according to an exemplary embodiment of the present disclosure.

Referring to FIG. 7, an input unit 110 according to another example of the sensor duplexing apparatus 100 includes a first sensor 111-a mounted at one left side of the robot and a second sensor 111-b mounted at one right side of the robot.

A logic unit 130 according to another example of the sensor duplexing apparatus 100 includes a first logic board 131-a corresponding to the first sensor 111-a and a second logic board 131-b corresponding to the second sensor 111-b.

The duplexing area corresponds to the first sensor 111-a and the second sensor 111-b.

That is, the duplexing of the sensor 111 may be implemented in a specific area of the omni-directional area of the robot. For example, the front area of the robot may be configured as a duplexing area by the first sensor 111-a and the second sensor 111-b. In contrast, a left area of the robot is configured by a first single area sensed only by the first sensor 111-a and a right area of the robot is configured by a second single area sensed only by the second sensor 111-b. In a rear area of the robot, a sensor 111 is not provided so that it is configured as an area which is not sensed.

Now, a method for duplexing a sensor of a mobile robot according to an exemplary embodiment of the present disclosure will be described with reference to FIG. 8.

Figure 8:
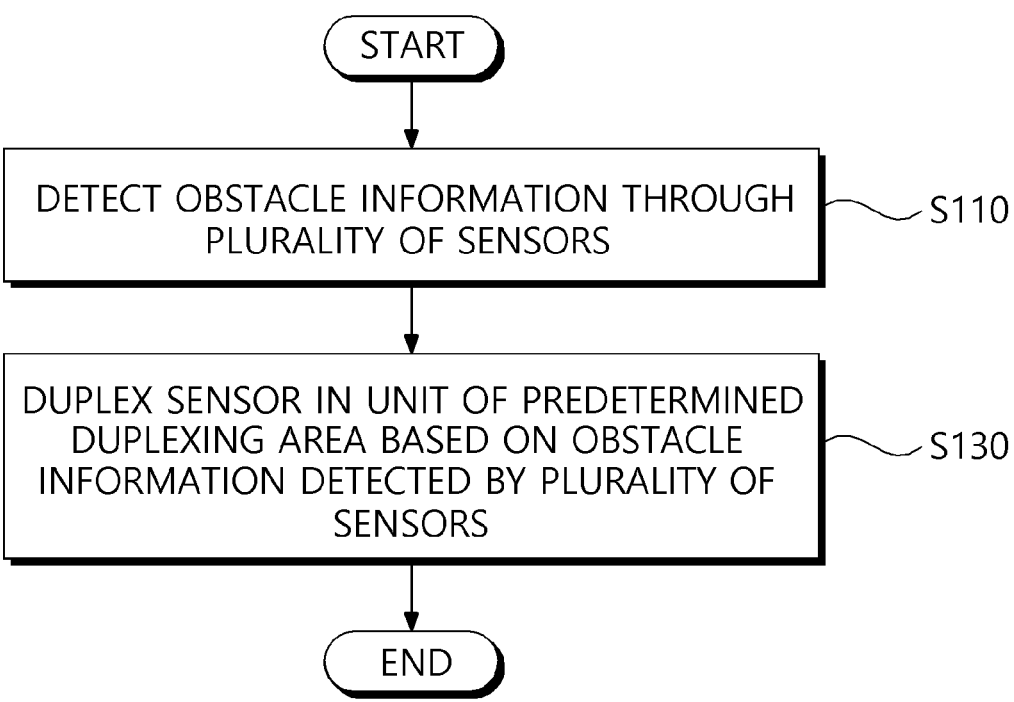
FIG. 8 is a flowchart for explaining a sensor duplexing method of a mobile robot according to an exemplary embodiment of the present disclosure.

FIG. 8 is a flowchart for explaining a sensor duplexing method of a mobile robot according to an exemplary embodiment of the present disclosure.

Referring to FIG. 8, the sensor duplexing apparatus 100 detects obstacle information by each of the plurality of sensors 111 (S110).

That is, the sensor duplexing apparatus 110 detects obstacle information by the sensor 111 based on the dynamic safety zone generated by the sensor 111. At this time, the dynamic safety zone is dynamically generated based on a movement direction and a movement speed of a robot including a sensor duplexing apparatus 100.

Next, the sensor duplexing apparatus 100 may duplex a sensor 111 in the unit of predetermined duplexing areas, based on the obstacle information detected by the plurality of sensors 111 (S130).

That is, the sensor duplexing apparatus 100 may duplex two sensors 111 based on obstacle information detected by two sensors 111 corresponding to the duplexing area.

Here, when the obstacle information detected by two sensors 111 corresponding to the duplexing area match, the sensor duplexing apparatus 100 may determine that two sensors 111 are successfully duplexed. In contrast, when the obstacle information detected by two sensors 111 corresponding to the duplexing area do not match, the sensor duplexing apparatus 100 may determine that duplexing of two sensors 111 has failed.

At this time, the sensor duplexing apparatus 100 may identify whether the obstacle information detected by two sensors 111 corresponding to the duplexing area match using predetermined sensor error information.

Figure 9:
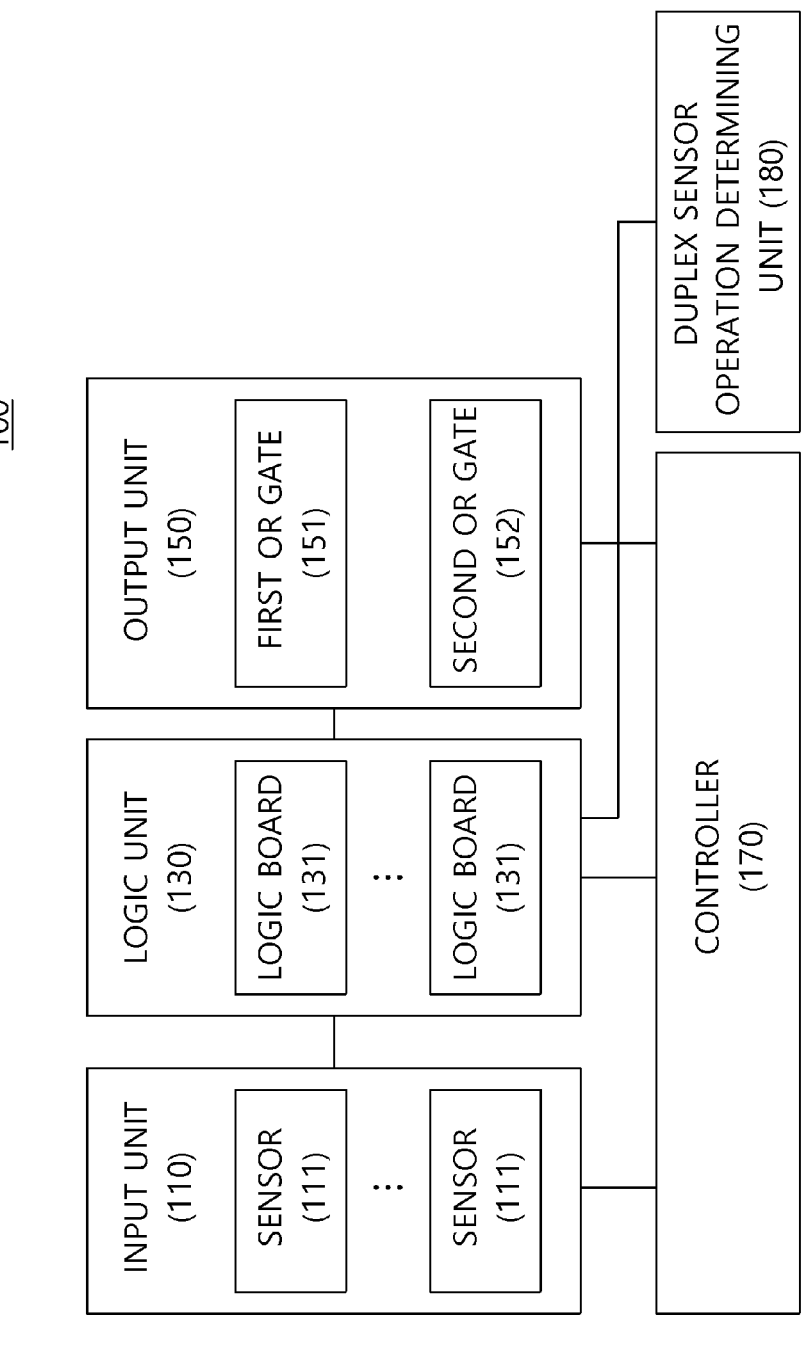
FIG. 9 is a block diagram schematically illustrating a duplex system architecture modularizing apparatus further

FIG. 9 is a block diagram schematically illustrating a duplex system architecture modulating apparatus further including a duplex sensor operation determining unit according to an exemplary embodiment of the present disclosure.

An input unit 110 of a modularizing apparatus 100 according to the exemplary embodiment includes a plurality of sensors mounted to sense an obstacle located in the vicinity of the mobile robot.

A logic unit 130 of the modularizing apparatus 100 includes a plurality of logic boards mounted so as to correspond to the sensors.

An output unit 150 of the modularizing apparatus 100 outputs a result according to a logical operation of the logic unit 150→130.

The control unit 170 of the modularizing apparatus 700 processes a duplex parameter of the sensors based on duplex setting information which divides the surrounding area of the mobile robot into a plurality of duplexing areas and the duplexing parameter includes duplex allocation information for sensors allocated to the duplexing areas.

The duplexing parameter further includes at least two or more information selected from logic board identification information, sensor location information, and logic board type information.

The duplex setting information further includes logic board identification information which is allocated differently according to each duplex area.

The control unit 170 generates a duplex parameter in the unit of duplex area or uses an already generated duplex parameter.

The duplex parameter further includes a first pair of logic board type information, a first pair of logic board type information and a first pair of sensor location information for a first duplex area and a second pair of logic board type information, a second pair of logic board type information, and a second pair of sensor location information for a second duplex area.

The processing of the duplex parameter by the control unit 170 further includes changing of the duplex parameter according to the duplex area.

The duplex area includes a first duplex area and a second duplex area which is adjacent to the first duplex area and sensors allocated to the first duplex area are different from each other and the first duplex area and the second duplex area may at least partially overlap.

The signal processing in the overlapping area may be processed in different methods according to the number of sensors.

The logic board identification information related to the modularizing apparatus 100 refers to an unique value of a logic board for identifying the logic board. The logic board type information is identification information according to a type of a sensor. For example, a type of sensor includes a LiDAR sensor, an IR sensor, an ultrasound sensor, and a camera. The LiDAR sensor includes a 2D LiDAR sensor and a 3D LiDAR Sensor and the type information may be distinguished according to a resolution.

The sensor location information includes actual location information in which a sensor is mounted. The sensor location information is information specifying where the mobile robot is located and where the mobile robot is directed. The sensor location information may include information about a location coordinate, orientation information about a directed direction, and viewing angle direction.

A duplexing system of the mobile robot may recognize the surrounding environment A plurality of sensors is allocated to every divided duplex area. One sensor may be allocated to cover one duplex area or allocated to a plurality of adjacent duplex areas.

A coverage area of the sensor may be larger than an allocated duplex area and there may be a remaining area which is not allocated. The processor does not perform separate real-time processing for object recognition on a sensor value for the remaining area acquired by the sensor, but store the sensor value for the remaining area in a memory for a predetermined time.

When there is a sensor which is suspicious to be defective, among the sensors, if sensor values acquired for the object are different for the sensors, the processor further uses the sensor value for the remaining area to determine the defect of the sensor or determine the object recognition.

The duplex setting information is information for dividing the surrounding area of the mobile robot into a plurality of duplex areas. The duplex setting information may be a value input by the user or may be a value which is adaptively generated and changed according to the traveling environment of the mobile robot. For example, when a plurality of front obstacles is sensed on the traveling path, in order to increase a sensing performance for the front area, it is necessary to divide the front area into more duplex areas. When the duplex setting information is changed, the control unit changes a duplex parameter. That is, a combination of the duplex area and a sensor may be configured in different forms.

The modularizing apparatus 100 according to the present disclosure further includes a duplex sensor operation determining unit 180.

The duplex sensor operation determining unit 180 determines a normal operation of an abnormal operation of the duplex sensor by interworking with the logic unit 130, the output unit 150, and the control unit 170.

The duplex sensor operation determining unit 180 acquires sensor data for every duplexing target from the logic unit and compares two acquired sensor data to review the reliability. According to the reliability review, if two sensor data is the same, it is determined that the reliability review has passed and if two sensor data is different, it is determined the reliability review has not been passed.

The duplex sensor operation determining unit 180 performs duplexing verification on the duplexing target which has passed the reliability review through the output unit 150. Here, the duplexing verification means verifying whether the duplex parameter for the duplexing target is normally output.

The duplex sensor operation determining unit 180 determines whether there is an abnormal sensor, that is, whether an abnormal sensor operates, by means of the reliability review or duplexing verification.

Thereafter, the duplex sensor operation determining unit 180 feeds back a failure diagnosis signal or a sensor correction signal to the control unit 170.

FIG. 10 is a block diagram schematically illustrating a duplex sensor operation determining device according to an exemplary embodiment of the present disclosure.

The duplex sensor operation determining device 40 according to the exemplary embodiment includes an I/O interface 41, a communication module 42, a processor 43, a memory 44, and a database 45. The duplex sensor operation determining device 40 of FIG. 10 is an example so that all blocks illustrated in FIG. 10 are not essential components and in the other exemplary embodiment, some blocks included in the duplex sensor operation determining device 40 may be added, modified, or omitted. In the meantime, the duplex sensor operation determining device 40 may be implemented by a computing device and each component included in the duplex sensor operation determining device 40 may be implemented by a separate software device or a separate hardware device in which the software is combined.

The duplex sensor operation determining device 40 according to the exemplary embodiment may be a device which performs the same function as the duplex sensor operation determining unit 180 of FIG. 9, but is not necessarily limited thereto, and may be a device corresponding to a partial function of the duplex sensor operation determining unit 180.

The communication module 42 refers to a means which receives or transmits a signal or data.

The communication module 42 interworks with the processor 43 to input various types of signals or data or directly acquires data by interworking with a device in the mobile robot or an external device to transmit the signal or data to the processor 43. For example, the communication module 42 may interwork with the logic unit 130, the output unit 150, and the control unit 170.

Further, the communication module 42 transmits the signal or data generated in the processor 43 to the device in the mobile robot 10 or an external device (for example, a server).

The communication module 42 may be connected to the I/O interface 41. The I/O interface 41 transmits information acquired from the communication module 42 to the processor 43 or receives a control signal from the processor 43 to substantially convert the information or the control signal into a signal for controlling the communication module 42.

The processor 43 according to the exemplary embodiment determines a normal operation or an abnormal operation of the duplex sensor.

The processor 43 performs an operation corresponding to all or a part of an operation performed by the duplex sensor operation determining unit 180.

The processor 43 compares two sensor data acquired for every duplexing target to perform the reliability review.

Further, the processor 43 performs the duplexing verification on the duplexing target which has passed the reliability review.

Further, the processor 43 determines whether there is an abnormal sensor, that is, whether an abnormal sensor operates, by means of the reliability review or duplexing verification.

Further, the processor 43 feeds back the failure diagnosis signal or the sensor correction signal.

The memory 44 includes at least one instruction or program which is executable by the processor 43. The memory 44 includes instructions or programs for controlling the mobile robot 10 and determining an operation of a sensor.

The database 45 refers to a general data structure implemented in a storage space (a hard disk or a memory) of a computer system using a database management program (DBMS) and means a data storage format which freely searches (extracts), deletes, edits, or adds data. The database 150 may be implemented according to the object of the exemplary embodiment of the present disclosure using a relational database management system (RDBMS) such as Oracle, Informix, Sybase, or DB2, an object oriented database management system (OODBMS) such as Gemston, Orion, or O2, and XML native database such as Excelon, Tamino, Sekaiju and has an appropriate field or elements to achieve its own function. In the meantime, the database 45 may be implemented as cloud or a virtual memory.

The database 45 according to the exemplary embodiment stores and provides information about control of the mobile robot 10, information about the safety area, the failure diagnosis signal, and the sensor correction signal.

It has been described that the database 45 is implemented in the duplex sensor operation determining device 40, but is not necessarily limited thereto and may be implemented as a separate data storage device.

FIG. 11 is a flowchart for explaining a duplex sensor operation determining method according to an exemplary embodiment of the present disclosure.

The duplex sensor operation determining device 40 acquires sensor data for every duplexing target from the logic unit 130 (S810) and compares two acquired sensor data to review the reliability. According to the reliability review, if two sensor data is the same, it is determined that the reliability review has passed and if two sensor data is different, it is determined the reliability review has not been passed.

The duplex sensor operation determining unit 40 performs duplexing verification on the duplexing target which has passed the reliability review through the output unit 150 (S840). Here, the duplexing verification means verifying whether the duplex parameter for the duplexing target is normally output.

When the duplexing review has been passed (S850), the duplex sensor operation determining device 40 determines that the duplex sensor normally operates (S860).

In the meantime, when the reliability review of step S830 or the duplexing verification of step S850 has not been passed, the duplex sensor operation determining device 40 determines that there is an operation of the abnormal sensor (S870). That is, it is determined that there is an abnormal sensor.

The duplex sensor operation determining device 40 may generate a defect diagnosis signal by considering whether to collect data, whether to normally supply the power, whether a sensor transmitter/receiver normally operates.

Specifically, when data for the abnormal sensor is not collected (S880) and the power is abnormally supplied (S882), the duplex sensor operation determining device 40 generates a defect diagnosis signal including notification information about necessity to confirm a power unit of an abnormal antenna (S884).

In the meantime, when the data for the abnormal sensor is collected (S880), the data is normal data in which a data format does not have an error (S890), and the sensor transmitter/receiver is in an abnormal operation state (S894), the duplex sensor operation determining device 40 generates a defect diagnosis signal including notification information about necessity to check hardware of the sensor transmitter/receiver of the abnormal antenna (S894).

Even though in FIG. 11, it is described that the steps are sequentially performed, the present invention is not necessarily limited thereto. In other words, the steps illustrated in FIG. 11 may be changed or one or more steps may be performed in parallel so that FIG. 11 is not limited to a time-series order.

The duplex sensor operation determining method according to the exemplary embodiment described in FIG. 11 may be implemented by an application (or a program) and may be recorded in a terminal (or computer) readable recording media. The recording medium which has the application (or program) for implementing the duplex sensor operation determining method according to the exemplary embodiment recorded therein and is readable by the terminal device (or a computer) includes all kinds of recording devices or media in which computing system readable data is stored.

FIG. 12 is a block diagram schematically illustrating a mobile robot according to an exemplary embodiment of the present disclosure.

A mobile robot 10 according to the exemplary embodiment of the present disclosure includes an environment sensing device 20, a power device 30, a control device 32, and a driving device 50. The mobile robot 10 of FIG. 12 is an example so that all blocks illustrated in FIG. 12 are not essential components and in the other exemplary embodiment, some blocks included in the mobile robot 10 may be added, modified, or omitted.

The mobile robot 10 according to the exemplary embodiment may be household cleaning robots, public building cleaning robots, logistics robots, service robots, and industrial robots.

The environment sensing device 20 refers to a device which senses motion information, surrounding obstacle information, and floor state information for the mobile robot 10.

The environment sensing device 20 includes a plurality of sensors and includes various sensors, such as a LiDAR sensor, a radar sensor, an image sensor, an IR sensor, and an ultrasonic sensor. Here, different sensors which are directed to an arbitrary duplexing area may be the same sensor, or the same type of sensors, or different types of sensors.

The environment sensing device 20 transmits information sensed by the plurality of sensors to the control device 32.

The power device 30 stores and supplies a power for an operation of the mobile robot 10.

The power device 30 applies a power while interworking with various configurations required to be applied with the power in the mobile robot 10.

The power device 30 may be implemented as a battery, but is not limited thereto.

The control device 32 performs an operation of controlling an overall operation of the mobile robot 10.

The control device 32 determines an operation of the duplex sensor of the mobile robot 10. The control device 32 determines a normal operation or an abnormal operation of the duplex sensor.

Further, the control device 32 performs the feedback on the defect diagnosis signal or the sensor correction signal.

An operation of the control device 32 which determines the operation of the duplex sensor is the same as those described in FIG. 9 to 11 or 13 so that a detailed description will be omitted.

Further, the control device 32 controls the driving of the mobile robot 10. The control device 32 generates an operation control signal based on the safety area and transmits the generated operation control signal to at least one motor included in the driving device 50 to control a driving force of the motor, thereby controlling the operation of the mobile robot 10.

The driving device 50 refers to a device including at least one motor equipped in the mobile robot 10. The driving device 50 may include various types of motors related to the operation of the mobile robot 10.

The driving device 50 according to the exemplary embodiment may include a mobile motor 56, but is not necessarily limited thereto and may further include various motors according to the type of the mobile robot 10.

The movement motor 56 is a motor for rotating main wheels (not illustrated) of the mobile robot 10 and is connected to the main wheels (not illustrated) and generates a driving force to rotate the main wheels (not illustrated).

The movement motor 56 rotates the main wheels (not illustrated) to move the mobile robot 10 along the movement route set by the control device 32 of the mobile robot 10.

Further, the movement motor 56 adaptively adjusts a driving force to rotate the main wheels so as to correspond to a movement speed or a size of the safety area based on the operation control signal received from the control device 32.

FIG. 13 is a flowchart for explaining a sensor correcting method according to an exemplary embodiment of the present disclosure.

The mobile robot 10 according to the exemplary embodiment corrects the duplex sensor. The mobile robot 10 corrects the duplex sensor further using a correction reference sensor.

Hereinafter, a sensor correcting method of a mobile robot 10 will be described. Here, the mobile robot compares a coordinate of sensor data for two sensors of a duplexing area and a target detection coordinate (S1210).

If the target detection coordinates of two sensors are the same (S1220), the mobile robot determines that the duplex sensor normally operates.

If the target detection coordinates of two sensors are not the same (S1220), the mobile robot switches the correction reference sensor to an operation state (ON state) (S1230). Here, the correction reference sensor maintains a non-operation state (OFF state) in a general situation in which the sensor correction is not performed.

The mobile robot 10 performs a verification operation of the correction reference sensor (S1240). Here, the verification operation of the correction reference sensor is an operation of checking whether sensing results of the sensors for the plurality of duplexing areas and the correction reference sensor match.

When the mobile robot 10 passes the verification of the correction reference sensor (S1250), the mobile robot 10 selects a sensor which corresponds to an abnormal sensor, between two sensors (S1260). Here, the mobile robot 10 selects a sensor which has a different result from the correction reference sensor in the duplexing area where two sensors are located, as an abnormal sensor.

The mobile robot 10 performs a correction operation on the selected sensor (S1270). The correcting operation on the selected sensor is desirably performed based on the corrected coordinate signal generated from the correction reference sensor, but is not necessarily limited thereto. For example, the correcting operation on the selected sensor may be performed based on synchronization of the normal sensor between two sensors.

Figure 15:
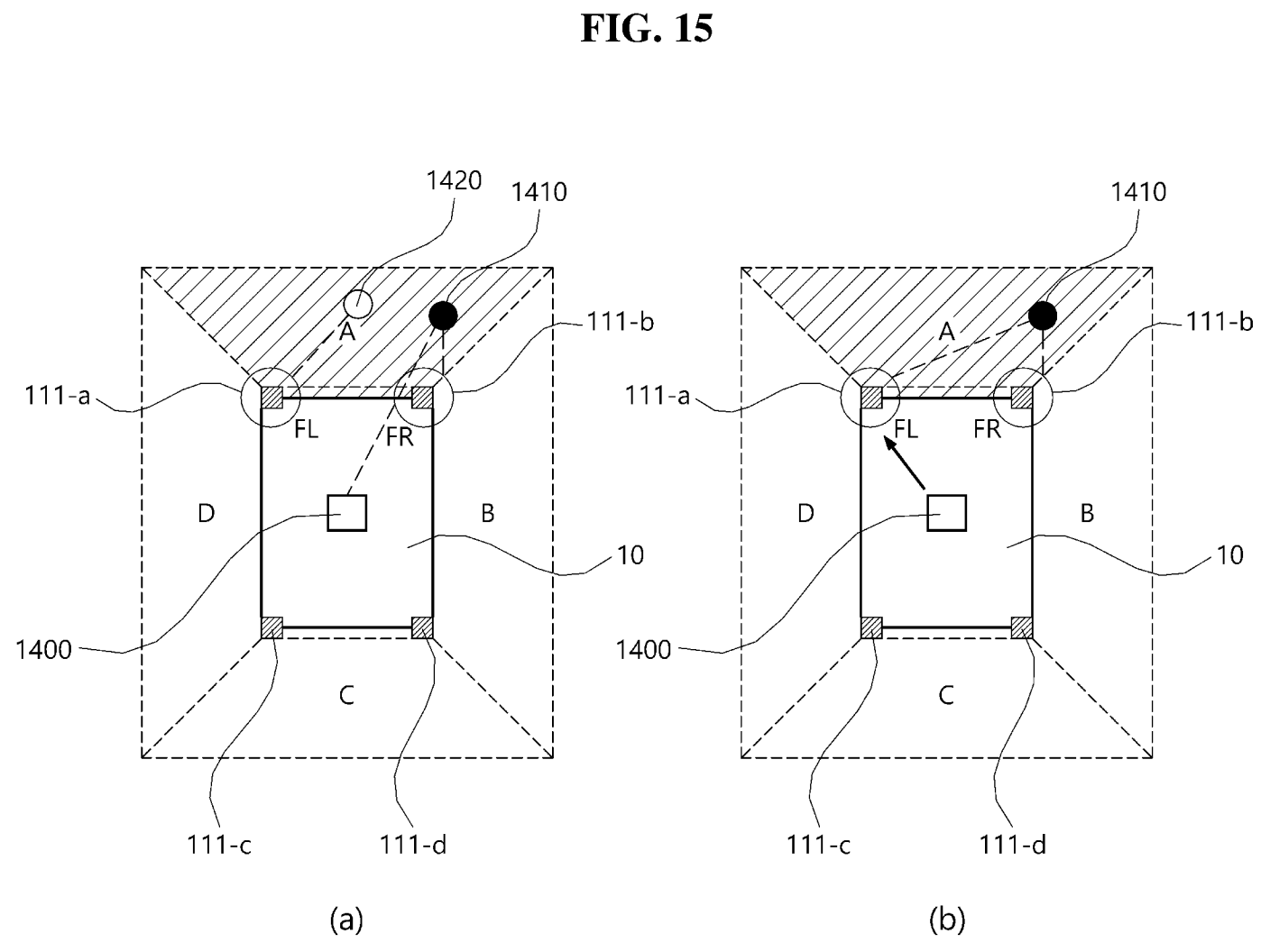
Figure 16:
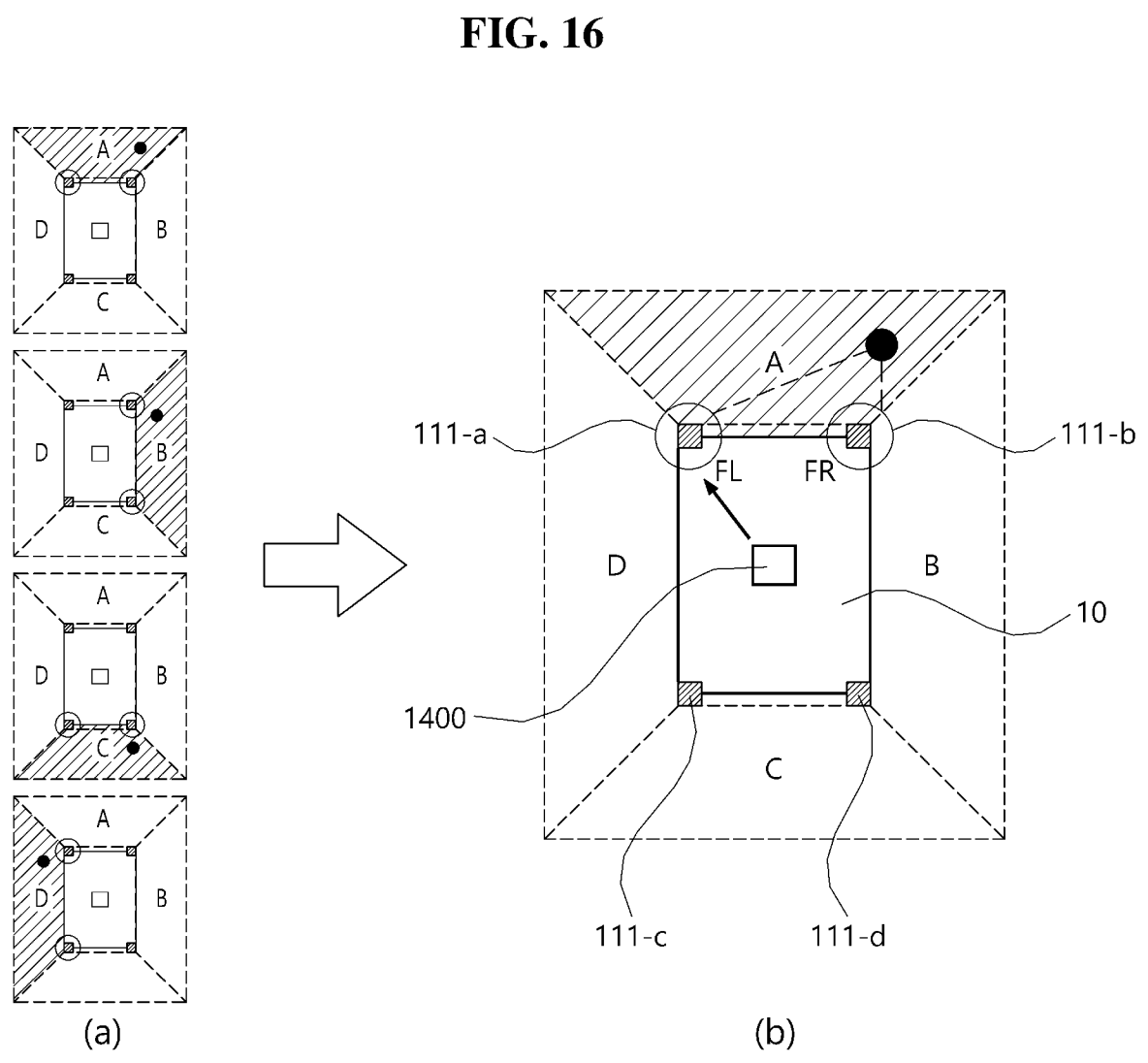

FIGS. 14 to 16 are exemplary views for explaining a sensor correcting operation according to an exemplary embodiment of the present disclosure.

The mobile robot 10 according to the exemplary embodiment includes a first sensor 111-*a* mounted at the front left side, a second sensor 111-*b* mounted at a front right side, a third sensor 111-*c* mounted at a rear left side, and a fourth sensor 111-*d* mounted at a rear right side.

The duplexing area includes a first duplexing area which corresponds to the first sensor 111-*a* and the second sensor 111-*b*, a second duplexing area which corresponds to the first sensor 111-*a* and the third sensor 111-*c*, a third duplexing area which corresponds to the second sensor 111-*b* and the fourth sensor 111-*d*, and a fourth duplexing area which corresponds to the third sensor 111-*c* and the fourth sensor 111-*d*.

FIG. 14 illustrates a result of detecting a target 1410 from a first duplexing area by a first sensor 111-*a* and a second sensor 1110*b* in a normal state.

The duplex sensor in the normal state confirms that the coordinates of the detected target 1410 are the same.

FIG. 15(*a*) illustrates that the first sensor 111-*a* is an abnormal state and a position of the target is detected as an abnormal location 1420.

As illustrated in FIG. 15(*b*), the mobile robot 10 confirms whether the first sensor 1110*a* is abnormal by the correction reference sensor and transmits the correction coordinate signal to the first sensor 111-*a* to perform the correction operation to recover the first sensor 111-*a* to a normal state.

FIG. 16 is a view for explaining a verification operation of the correction reference sensor.

FIG. 16(*a*) illustrates an operation of verifying duplex sensors for the first duplex image to the second duplex area and the correction reference sensor.

In FIG. 16(*b*), after normally completing the verification operation of the correction reference sensor, the correction operation of the first sensor 111-*a* is performed to recover the first sensor 111-*a* to the normal state.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protective scope of the present disclosure should be construed based on the following claims, and all the technical concepts in the equivalent scope thereof should be construed as falling within the scope of the present disclosure.

What is claimed is:

1. A fault-tolerant sensor duplexing apparatus implemented in a mobile robot to improve obstacle detection reliability, the apparatus comprising:

input circuitry including a plurality of sensors mounted to sense obstacles located in a vicinity of the mobile robot;

logic circuitry including a plurality of logic boards respectively corresponding to the plurality of sensors and configured to receive sensor data from the plurality of sensors;

a controller configured to define a plurality of predetermined duplexing areas by partitioning a surrounding area of the mobile robot into a plurality of duplexing areas, and to duplex sensors in units of the predetermined duplexing areas by assigning, to each predetermined duplex area, at least two of the plurality of sensors having overlapping fields of view; and output circuitry configured to output a result according to a logical operation of the controller;

a driving device comprising a movement motor and configured to generate a driving force to drive the mobile robot, wherein the driving device receives the result from the output circuitry and controller, wherein the controller is configured to, for each predetermined duplexing area, acquire obstacle information detected by the at least two sensors assigned to the predetermined duplexing area, and to determine whether the obstacle information detected by the at least two sensors assigned to the predetermined duplexing area match by using predetermined sensor error information, wherein the predetermined sensor error information includes at least one condition or criterion used to determine whether the obstacle information detected by the at least two sensors assigned to the predetermined duplexing area are regarded as matching, and wherein the controller is further configured to generate control information to control an operation of the mobile robot based on duplexed obstacle information obtained from obstacle information determined to be matching, and the output circuitry is configured to output the control information to the driving device to control the driving force of the movement motor and the operation of the mobile robot based on the duplexed obstacle information.

2. The fault-tolerant sensor duplexing apparatus according to claim 1, wherein the controller duplexes two sensors based on obstacle information detected by two sensors corresponding to the duplexing area.

3. The fault-tolerant sensor duplexing apparatus according to claim 2, wherein when obstacle information detected by two sensors corresponding to the duplexing area match, the controller determines that duplexing of two sensors is successful and when obstacle information detected by two sensors corresponding to the duplexing area do not match, the controller determines that duplexing of two sensors has failed.

4. The fault-tolerant sensor duplexing apparatus according to claim 2, wherein the controller duplexes two sensors using obstacle information detected by two sensors based on the dynamic safety zone generated by two sensors corresponding to the duplexing area.

5. The fault-tolerant sensor duplexing apparatus according to claim 1, wherein in the input circuitry, a first sensor is mounted at a front left side of the robot, a second sensor mounted at a front right side of the robot, a third sensor mounted at a rear left side of the robot, and a fourth sensor mounted at a rear right side of the robot, the logic circuitry includes first logic circuitry corresponding to the first sensor, second logic circuitry corresponding to the second sensor, a third logic board corresponding to the third sensor, and a fourth logic board corresponding to the fourth sensor, and the duplexing area includes a first duplexing area corresponding to the first sensor and the second sensor, a second duplexing area corresponding to the first sensor and the third sensor, a third duplexing area corresponding to the second sensor and the fourth sensor, and a fourth duplexing area corresponding to the third sensor and the fourth sensor.

6. The fault-tolerant sensor duplexing apparatus according to claim 5, wherein the mobile robot compares a coordinate of the sensor data for two sensor included in a predetermined duplexing area and the target detection coordinate and when the target detection coordinates of two sensors are not the same, determines that there is an abnormal sensor and transmits a correction coordinate signal to the abnormal sensor or corrects the abnormal sensor by synchronization with the normal sensor.

7. The fault-tolerant sensor duplexing apparatus according to claim 1, wherein in the input circuitry, a first sensor is mounted at one left side of the robot and a second sensor is mounted at one right side of the robot, in the logic circuitry, a first logic board corresponding to the first sensor and a second logic board corresponding to the second sensor are mounted, and the first sensor and the second sensor correspond to the duplexing area.

8. The fault-tolerant sensor duplexing apparatus according to claim 1, wherein the logic board and the controller are integrally implemented and the logic board duplexes two sensors based on obstacle information detected by two sensors corresponding to the duplexing area.

9. The fault-tolerant sensor duplexing apparatus according to claim 1, wherein the sensor mounted in the input circuitry is a LiDAR sensor.

10. The fault-tolerant sensor duplexing apparatus according to claim 1, further comprising:

a duplex sensor operation determining circuitry which acquires sensor data for every duplexing target from the logic circuitry to determine a normal operation or an abnormal operation of the duplex sensor.

11. The fault-tolerant sensor duplexing apparatus according to claim 10, wherein the duplex sensor operation determining circuitry reviews the reliability by comparing two sensor data acquired for every duplexing target and determines that the reliability review has been passed when two sensor data is the same, and determines that the reliability review has not been passed when two sensor data is different.

12. The fault-tolerant sensor duplexing apparatus according to claim 11, wherein the duplex sensor operation determining circuitry generates a defect diagnosis signal of an abnormal sensor which has not passed the reliability review by considering at least one of whether to collect data, whether a power is normally supplied, and whether a sensor transmitter/receiver normally operates.

13. A sensor duplexing method for improving obstacle detection reliability in a mobile robot using a sensor duplexing apparatus including: input circuitry which includes a plurality of sensors mounted to sense obstacles located in a vicinity of the mobile robot, logic circuitry which includes a plurality of logic boards corresponding to the sensors, a controller, and output circuitry, the method comprising:

defining a plurality of predetermined duplexing areas by partitioning a surrounding area of the mobile robot into a plurality of duplexing areas;

assigning, to each predetermined duplexing area, at least two of the plurality of sensors having overlapping fields of view so that the at least two sensors correspond to the predetermined duplexing area;

storing predetermined sensor error information including at least one condition or criterion used to determine whether obstacle information detected by the at least two sensors assigned to each predetermined duplexing area are regarded as matching;

detecting obstacle information by means of each of the plurality of sensors;

acquiring, for each predetermined duplexing area, obstacle information detected by the at least two sensors assigned to the predetermined duplexing area;

determining, based on the predetermined sensor error information, whether the obstacle information detected by the at least two sensors assigned to the predetermined duplexing area match, wherein when the obstacle information detected by the at least two sensors assigned to the predetermined duplexing area are determined to match, generating duplexed obstacle information and generating control information to control an operation of the mobile robot based on the duplexed obstacle information, and outputting the control information from the output circuitry; and controlling the operation of the mobile robot by controlling a driving force of a motor of a driving device receiving the control information from the output circuitry based on the generated duplexed obstacle information.

14. The sensor duplexing method according to claim 13, wherein the duplexing is configured by:

duplexing the two sensors based on obstacle information detected by two sensors corresponding to the duplexing area.

15. The sensor duplexing method according to claim 14, wherein the duplexing is configured by determining that duplexing of two sensors is successful when obstacle information detected by two sensors corresponding to the duplexing area match, and determining that duplexing of two sensors has failed when obstacle information detected by two sensors corresponding to the duplexing area do not match.

16. A computer program stored in a computer readable recording medium to allow a computer to execute the sensor duplexing method of a mobile robot according to claim 13.

* * * * *